United States Patent
Inaba (10) Patent No.: US 9,834,088 B2
(45) Date of Patent: Dec. 5, 2017

(54) WORK VEHICLE

(71) Applicant: Kubota Corporation, Osaka-shi (JP)

(72) Inventor: Daisuke Inaba, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 0 days.

(21) Appl. No.: 15/150,433

(22) Filed: May 10, 2016

(65) Prior Publication Data

US 2016/0339778 A1 Nov. 24, 2016

(30) Foreign Application Priority Data

May 21, 2015 (JP) .................................. 2015-103818

(51) Int. Cl.
*B60K 15/03* (2006.01)
*B60K 15/01* (2006.01)
*B60K 15/035* (2006.01)

(52) U.S. Cl.
CPC .... *B60K 15/01* (2013.01); *B60K 2015/03509* (2013.01); *B60Y 2200/221* (2013.01)

(58) Field of Classification Search
CPC ........ B60K 15/00; B60K 15/01; B60K 15/03; B60K 2015/03236; B60K 2015/03509; B60Y 2200/221
USPC ....................................................... 180/69.4
See application file for complete search history.

(56) References Cited

U.S. PATENT DOCUMENTS

| | | | | |
|---|---|---|---|---|
| 4,107,052 A | * | 8/1978 | Yoshino | B01D 17/0208 137/172 |
| 4,328,825 A | * | 5/1982 | Bishai | B01D 17/0214 137/172 |
| 4,595,030 A | * | 6/1986 | Yazaki | B01D 17/0214 137/172 |
| 4,898,140 A | * | 2/1990 | Pages | F02D 33/006 123/510 |
| 5,368,001 A | * | 11/1994 | Roche | B01D 35/027 123/510 |
| 6,260,542 B1 | * | 7/2001 | Kochsmeier | B60K 15/077 123/509 |
| 6,953,527 B2 | * | 10/2005 | Brower | B01D 36/003 210/172.2 |
| 7,182,071 B2 | * | 2/2007 | Hansson | B60K 15/03 123/514 |

(Continued)

FOREIGN PATENT DOCUMENTS

JP 2013-189939 9/2013

*Primary Examiner* — James A Shriver, II
*Assistant Examiner* — Brian L Cassidy
(74) *Attorney, Agent, or Firm* — Mori & Ward, LLP (57) ABSTRACT

A work vehicle includes a front and a rear opposite to the front in a front-rear direction of the work vehicle, and a lateral direction perpendicular to the front-rear direction. The work vehicle further includes an engine, a hood, a fuel tank, a fuel supply path, a separator, and a front protector. The hood is to cover the engine. The fuel tank is to store fuel. The fuel stored in the fuel tank is to be supplied to the engine via the fuel supply path. The separator is provided in the fuel supply path to remove water in the fuel flowing through the fuel supply path. The separator includes a protruding portion protruding from the hood in the lateral direction. The front protector is provided at a front side with respect to the protruding portion of the separator to protect a front portion of the protruding portion.

8 Claims, 7 Drawing Sheets

(56) References Cited

U.S. PATENT DOCUMENTS

| | | | |
|---|---|---|---|
| 7,429,322 B2* | 9/2008 | Fujita | B01D 17/00 |
| | | | 210/172.4 |
| 7,507,131 B2* | 3/2009 | Schaefer, Jr. | B01D 19/0042 |
| | | | 440/88 F |
| 9,308,813 B1* | 4/2016 | Egami | F02M 37/14 |
| 2010/0024775 A1* | 2/2010 | Takahashi | F02M 37/007 |
| | | | 123/470 |
| 2016/0016463 A1* | 1/2016 | Kimura | B60K 15/03 |
| | | | 137/565.01 |
| 2016/0237965 A1* | 8/2016 | Kerrin | F02M 37/221 |

* cited by examiner

FIG. 7

WORK VEHICLE

CROSS-REFERENCE TO RELATED APPLICATIONS

The present application claims priority under 35 U.S.C. §119 to Japanese Patent Application No. 2015-103818, filed May 21, 2015, entitled "Work Vehicle". The contents of this application are incorporated herein by reference in their entirety.

BACKGROUND OF THE INVENTION

Field of the Invention
The present invention relates to a work vehicle.
Discussion of the Background
Japanese Patent Application Laid-open No. 2013-189939 discloses a work vehicle which includes a water remover provided in a fuel supply path via which fuel is supplied from a fuel tank to an engine. The water remover is configured to remove water from the fuel flowing through the fuel supply path. The entire water remover is under a hood.

SUMMARY OF THE INVENTION

According to one aspect of the present invention, a work vehicle includes a front and a rear opposite to the front in a front-rear direction of the work vehicle, and a lateral direction perpendicular to the front-rear direction. The work vehicle further includes an engine, a hood, a fuel tank, a fuel supply path, a separator, and a front protector. The hood is to cover the engine. The fuel tank is to store fuel. The fuel stored in the fuel tank is to be supplied to the engine via the fuel supply path. The separator is provided in the fuel supply path to remove water in the fuel flowing through the fuel supply path. The separator includes a protruding portion protruding from the hood in the lateral direction. The front protector is provided at a front side with respect to the protruding portion of the separator to protect a front portion of the protruding portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.
An embodiment of the present invention will be described below based on the drawings.

Figure 1:
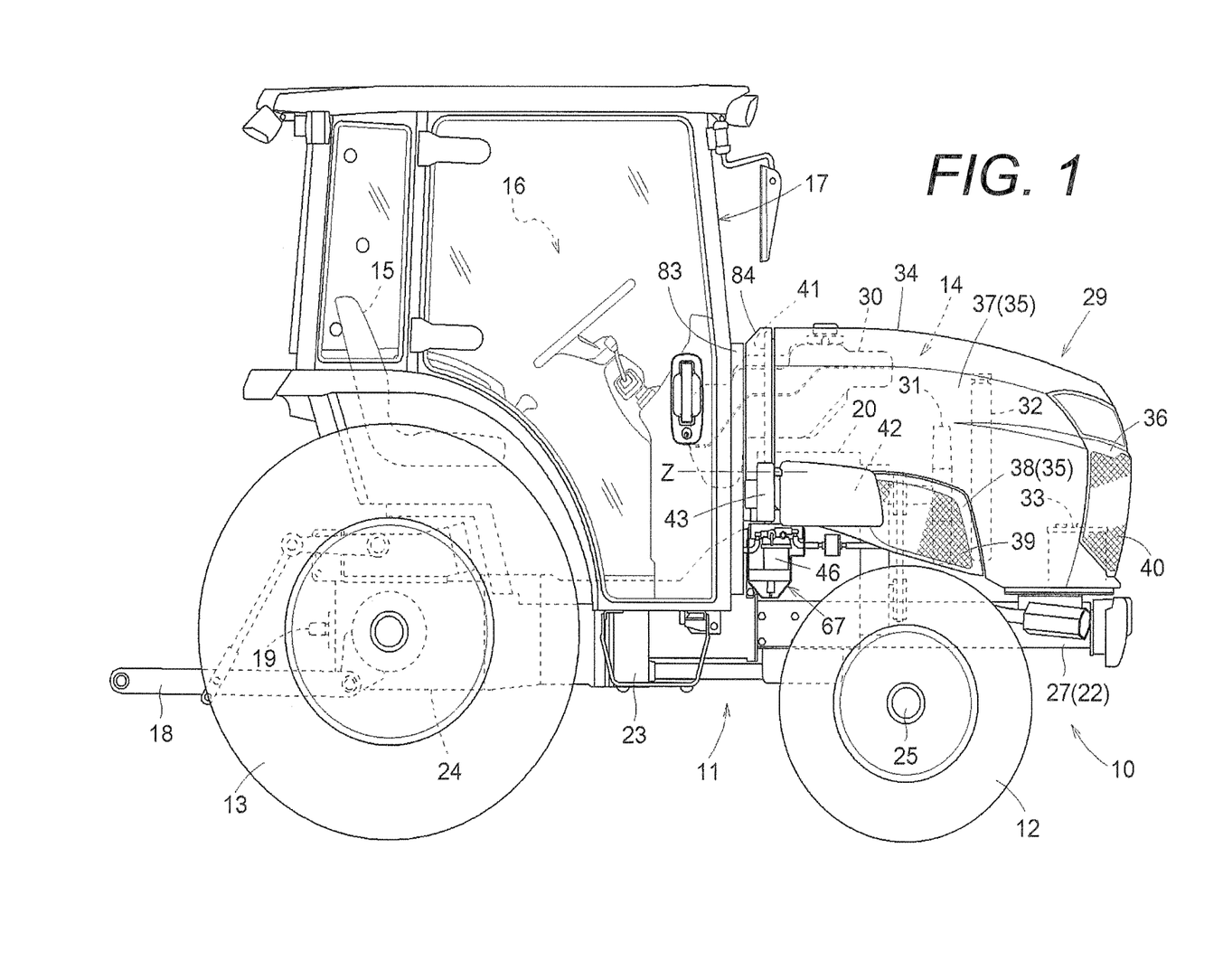
FIG. 1 is a whole side view of a tractor.
Figure 2:
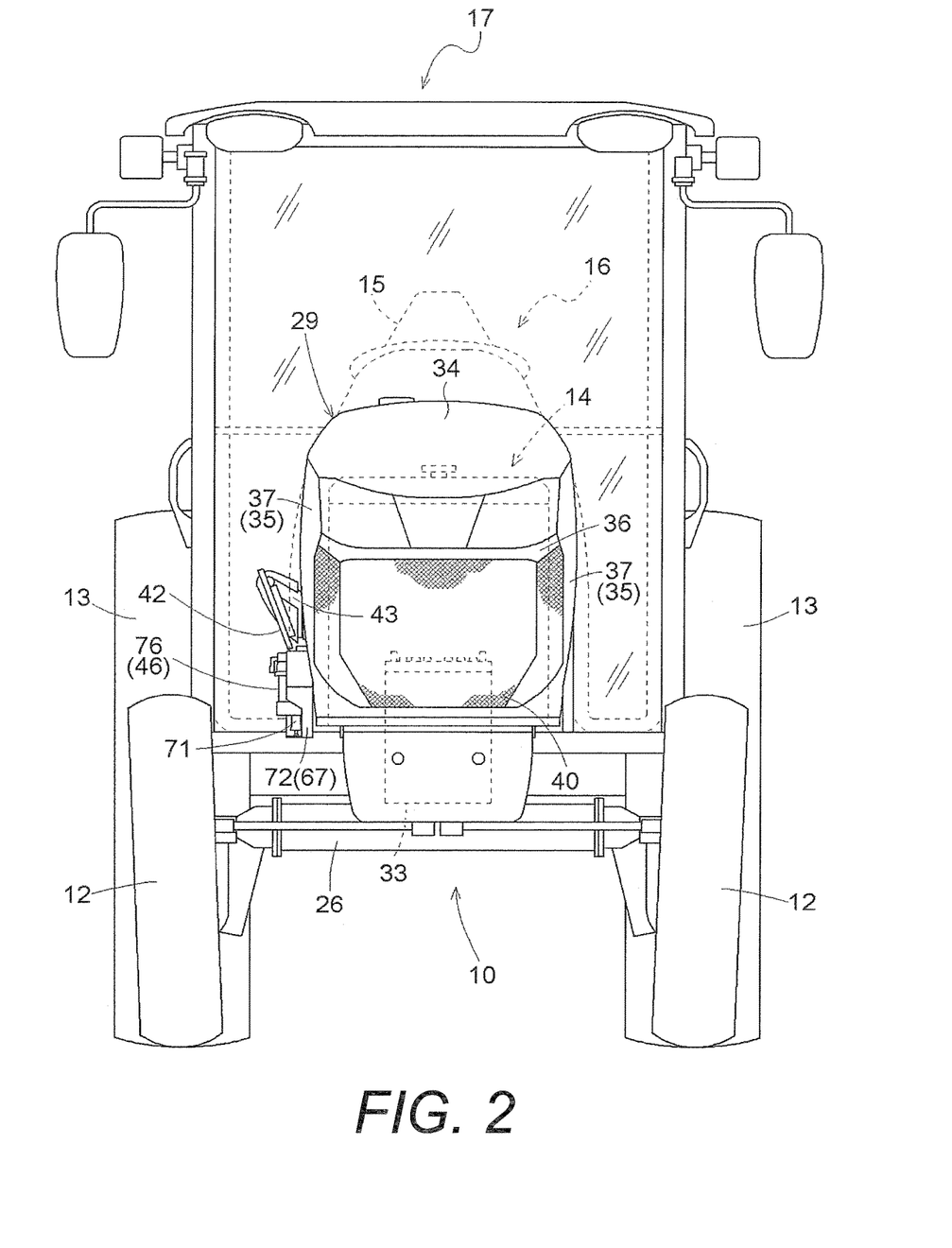
FIG. 2 is a whole front view of the tractor.

As shown in FIGS. 1 and 2, a tractor (an example of a "work vehicle") includes a four-wheel-drive traveling machine body 10. The traveling machine body 10 has a machine body frame 11 which extends in a front-rear direction and by which paired left and right front wheels 12 capable of being driven and steered and paired left and right rear wheels 13 capable of being driven and braked are supported.

A motor section 14 is provided at a front portion of the traveling machine body 10. At a rear portion of the traveling machine body 10, a driving section 16 having a driver's seat 15 and a cabin 17 covering the driving section 16 are provided. At a rear end portion of the traveling machine body 10, a linkage 18 formed by paired left and right lift arms and a power takeoff shaft 19 are provided. A work device (not shown) such as a rotary tilling device is connected to the linkage 18 in such a manner that the work device can be lifted and lowered and the power takeoff shaft 19 is interlocked with and connected to the work device. In this way, it is possible to lift/lower and drive the work device.

Figure 3:
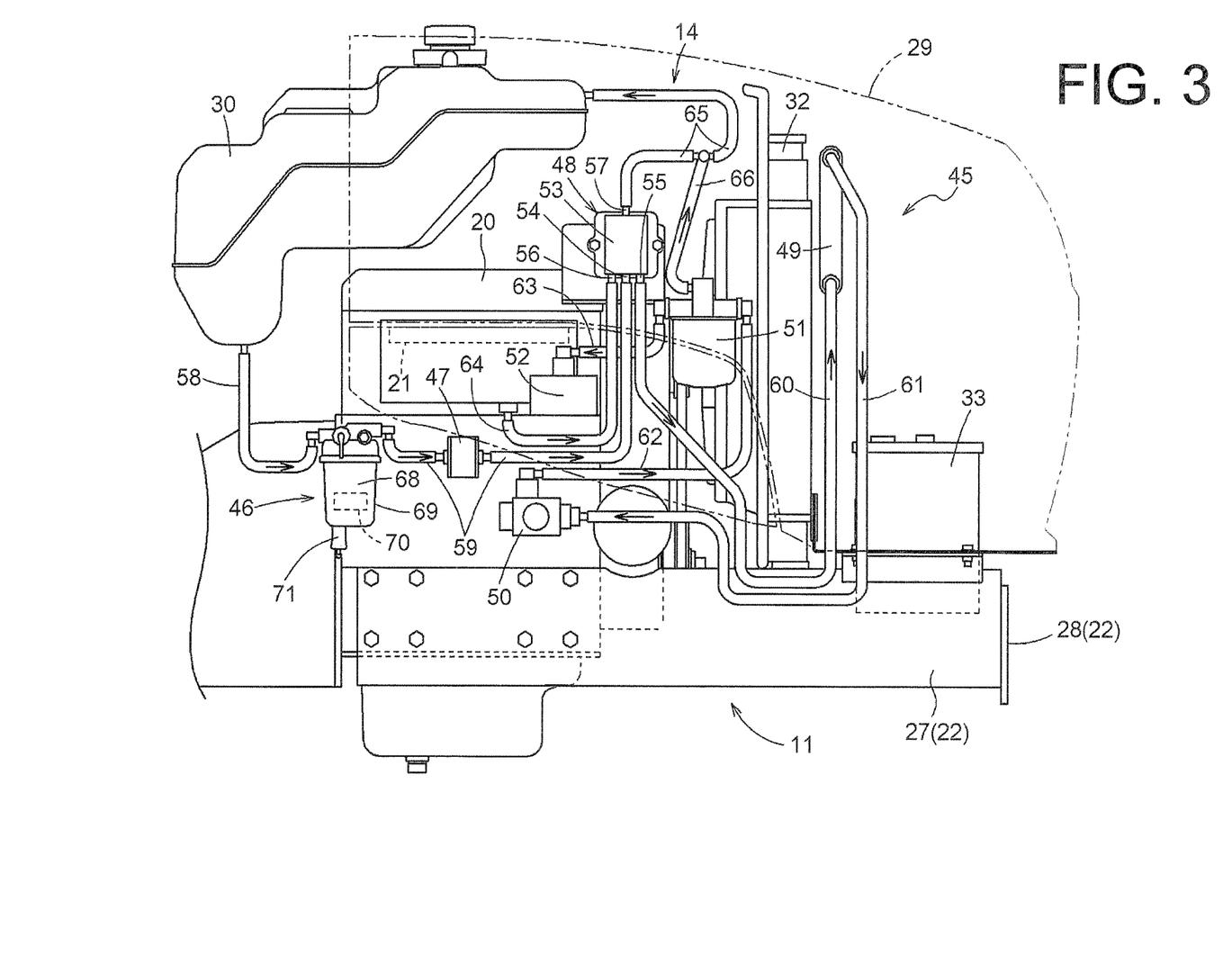
FIG. 3 is a side view of a fuel supply system.

As shown in FIGS. 1 and 3, an engine 20 is supported on the machine body frame 11. The engine 20 is a common-rail diesel engine having a rail 21 and a plurality of injectors (not shown) and injection amounts and injection timing of fuel can be controlled electronically. The machine body frame 11 has a front axle frame 22 connected to a lower portion of the engine 20 and extending forward, a transmission housing 23 connected to a rear portion of the engine 20, and a transmission case 24 connected to a rear end portion of the transmission housing 23 and positioned below the driver's seat 15. The front axle frame 22 supports a front axle case 26 for supporting a front axle 25 to which the front wheels 12 are connected so that the front axle 25 can turn. The front axle frame 22 has paired left and right front-rear frames 27 extending along a front-rear direction of the machine body and a connecting frame 28 for connecting front end portions of the front-rear frames 27. Power of the engine 20 can be transmitted to the front wheels 12 via the front axle case 26. The power of the engine 20 can be transmitted to the rear wheels 13 via the transmission case 24.

As shown in FIGS. 1 to 4, the motor section 14 has a hood 29 for covering the engine 20. Installed in an installation space formed inside the hood 29 in addition to the engine 20 are a fuel tank 30 capable of storing fuel to be supplied to the engine 20, a cooling fan 31 driven by the power of the engine 20, a radiator 32 for cooling the engine 20, a battery 33 for electrical components, a DPF device (not shown) for removing exhaust particulates included in exhaust from the engine 20, and the like.

The hood 29 has a top plate portion 34 positioned above the engine 20, side plate portions 35 respectively connected to left and right side end portions of the top plate portion 34 and positioned beside and outside the engine 20, and a front plate portion 36 connected to a front end portion of the top plate portion 34 and front end portions of the respective side plate portions 35 and positioned in front of the engine 20.

As shown in FIG. 1, each of the left and right side plate portions 35 has a side panel 37 integral with the top plate portion 34 and a side cover 38 extending from a position near a central portion in a front-rear direction of a lower side of the side panel 37 to a rear end portion of the lower side. The side cover 38 is attachable to and detachable from the side panel 37. A side face of the side panel 37 and a side face of the side cover 38 are flush with each other. A mesh-like side vent portion 39 through which air can flow is formed at each of the side covers 38. Through the side vent portions 39, the air can flow between an inside and an outside of the hood 29 along a sideway direction.

At the front plate portion 36, a mesh-like front vent portion 40 through which the air can flow is formed. Through the front vent portion 40, the air can flow between the inside and the outside of the hood 29 along the front-rear direction.

Figure 4:
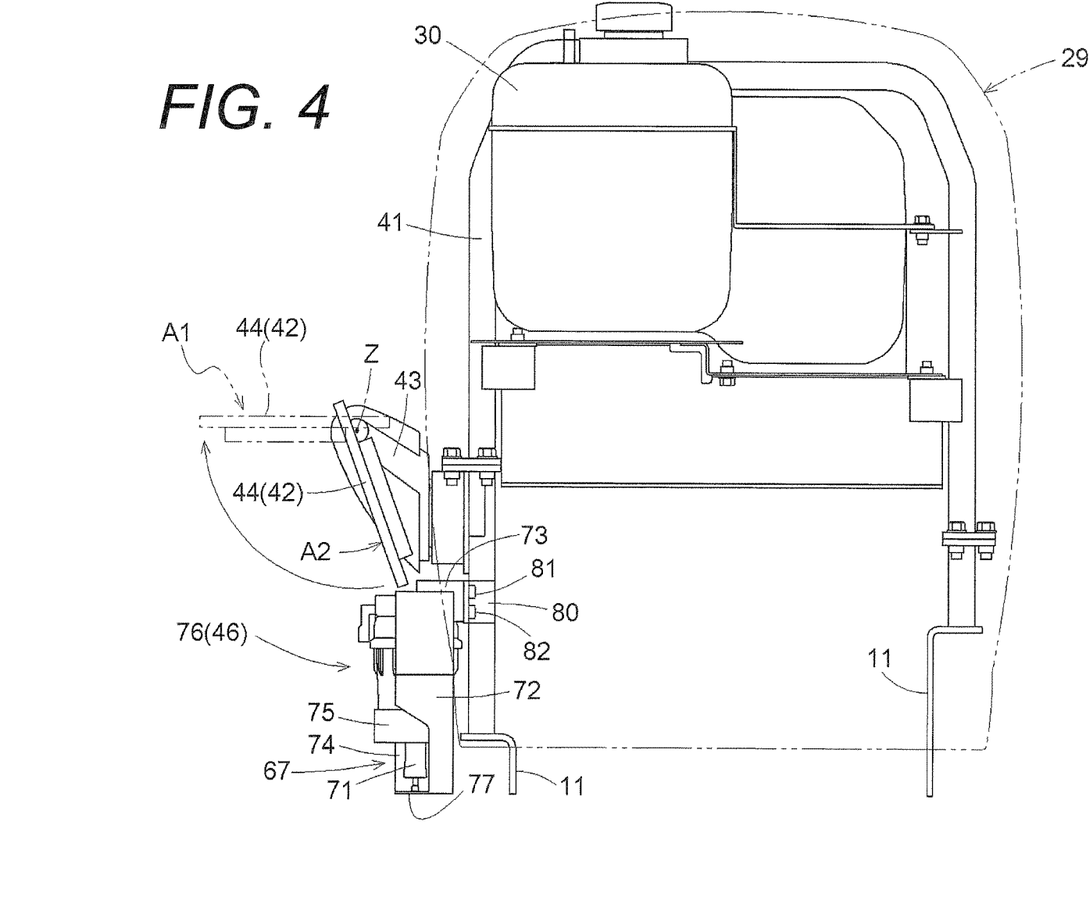
FIG. 4 is a front view of a layout around a separator.

As shown in FIGS. 1 and 4 to 6, a support column portion 41 formed by an inverted-U-shaped pipe frame is supported on the machine body frame 11. The support column portion 41 surrounds the fuel tank 30. Beside the fuel tank 30, a placing table 42 on which an oil tank for filling the fuel tank 30 can be placed is provided. The placing table 42 is supported on the support column portion 41 with a support member 43 interposed therebetween. As shown in FIG. 4, the placing table 42 is formed to be able to turn about front-rear axis Z and to be switched between placing attitude A1 in which a placing face 44 is oriented horizontally and folding attitude A2 in which the placing face 44 faces sideways.

As shown in FIG. 3, the traveling machine body 10 has a fuel supply system 45 for supplying the fuel from the fuel tank 30 to the engine 20. The fuel supply system 45 has a separator 46, an electromagnetic pump 47, a confluence discharge portion 48, a cooling portion 49, a feed pump 50, a filter 51, and a supply pump 52 in this order from an upstream side in a fuel supply direction.

The separator 46, the electromagnetic pump 47, the confluence discharge portion 48, the feed pump 50, the filter 51, and the supply pump 52 are disposed to the right of the engine 20. The fuel tank 30, the electromagnetic pump 47, the confluence discharge portion 48, the cooling portion 49, the feed pump 50, the filter 51, and the supply pump 52 are provided in the installation space in the hood 29.

The confluence discharge portion 48 has a confluence storage portion 53 capable of storing the fuel, an introducing port 54 for introducing the fuel from the fuel tank 30 into the confluence storage portion 53, a discharge port 55 for discharging the fuel from the confluence storage portion 53 toward the engine 20, a return port 56 for introducing the fuel from the engine 20 into the confluence storage portion 53, and a returning port 57 for discharging the fuel from the confluence storage portion 53 into the fuel tank 30.

The fuel tank 30 and the separator 46 are connected by a first duct 58. The separator 46 and the introducing port 54 of the confluence discharge portion 48 are connected by a second duct 59. The second duct 59 is provided with the electromagnetic pump 47. The discharge port 55 of the confluence discharge portion 48 and the cooling portion 49 are connected by a third duct 60. The cooling portion 49 and the feed pump 50 are connected by a fourth duct 61. The feed pump 50 and the filter 51 are connected by a fifth duct 62. The filter 51 and the supply pump 52 are connected by a sixth duct 63. The engine 20 and the return port 56 of the confluence discharge portion 48 are connected by a seventh duct 64. The returning port 57 of the confluence discharge portion 48 and the fuel tank 30 are connected by an eighth duct 65. The filter 51 and a midpoint portion of the eighth duct 65 are connected by a ninth duct 66.

The fuel stored in the fuel tank 30 is pressurized by the electromagnetic pump 47 and sent to the cooling portion 49 via the first duct 58, the separator 46, the second duct 59, the introducing port 54 of the confluence discharge portion 48, the confluence storage portion 53 of the confluence discharge portion 48, the discharge port 55 of the confluence discharge portion 48, and the third duct 60 in this order. In the separator 46, water included in the fuel is separated and removed. In the confluence storage portion 53 of the confluence discharge portion 48, the heated fuel returned through the return port 56 from the engine 20 and the fuel supplied from the fuel tank 30 join each other. The joined fuel in the confluence storage portion 53 of the confluence discharge portion 48 is discharged from the discharge port 55 of the confluence discharge portion 48 toward the engine 20. In the cooling portion 49, the fuel is cooled to a temperature in a desired temperature range. The fuel cooled in the cooling portion 49 is pressurized by the feed pump 50 and sent to the fourth duct 61, the fifth duct 62, the filter 51, the sixth duct 63, and the supply pump 52 in this order. At the filter 51, impurities such as deposits included in the fuel are removed. The fuel from which the impurities have been removed is pressurized by the supply pump 52 and supplied into the rail 21 of the engine 20. In this manner, a fuel supply route for supplying the fuel stored in the fuel tank 30 to the engine 20 is formed.

Surplus fuel of the engine 20 is returned into the confluence storage portion 53 of the confluence discharge portion 48 via the seventh duct 64 and the return port 56 of the confluence discharge portion 48. The surplus fuel of the engine 20 is surplus fuel at the rail 21 and the injectors (not shown). The surplus fuel in the confluence storage portion 53 of the confluence discharge portion 48 is returned into the fuel tank 30 from the returning port 57 of the confluence discharge portion 48 via the eighth duct 65. The surplus fuel at the filter 51 joins the eighth duct 65 via the ninth duct 66 and is returned into the fuel tank 30. In this manner, a fuel returning route for returning the surplus fuel into the fuel tank 30 is formed.

Separator and Protective Member for the Same

As shown in FIG. 3, the separator 46 is provided at some midpoint of the fuel supply route for supplying the fuel from the fuel tank 30 toward the engine 20. The separator 46 is formed to separate and remove the water from the fuel flowing through the fuel supply route. As shown in FIGS. 1, 2, and 4 to 6, a protecting member 67 for protecting the separator 46 is provided near the separator 46.

As shown in FIGS. 2 and 4, the separator 46 is disposed so that a part of the separator 46 protrudes sideways and outward from a side face of the hood 29 and that a remaining part of the separator 46 is positioned in the installation space in the hood 29. In other words, the separator 46 is disposed so that at least a part of the separator 46 protrudes further sideways and outward than the side panel 37 and the side cover 38 forming the side face of the hood 29.

Figure 5:
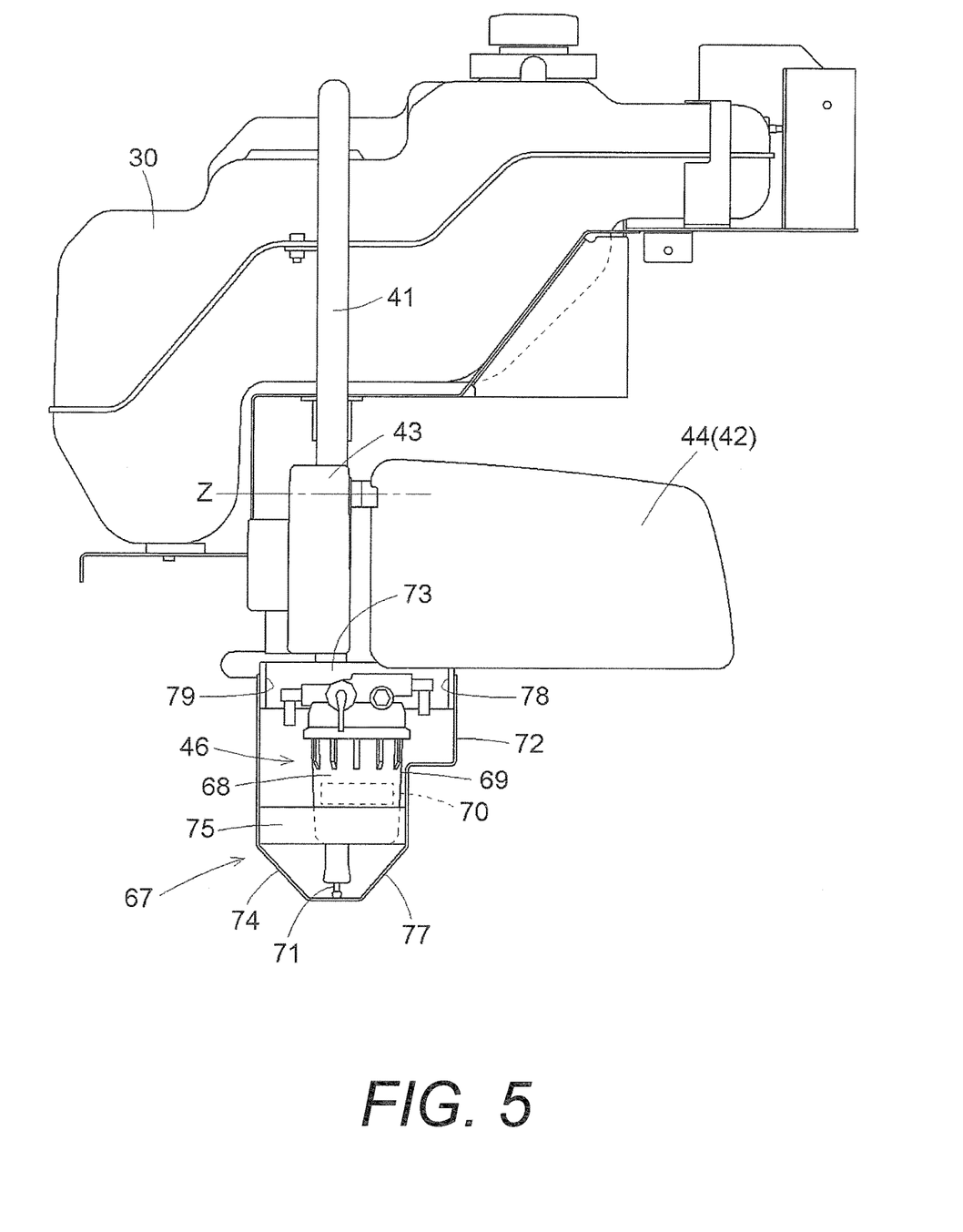
FIG. 5 is a side view of the layout around the separator.

As shown in FIGS. 5 and the like, the separator 46 has a removed water storage portion 68, a light-permeable portion 69 which lets light through, a float 70 disposed in the removed water storage portion 68, a drain portion 71, and the like. The removed water storage portion 68 is formed to be able to store removed water formed by the water separated and removed from the fuel in the fuel supply route. The light-permeable portion 69 is formed at a peripheral portion of a storage tank forming the removed water storage portion 68. In other words, the entire peripheral portion of the storage tank forming the removed water storage portion 68 lets the light therethrough. The float 70 floats up in the removed water storage portion 68 when the removed water collects in the removed water storage portion 68. The drain portion 71 can discharge the removed water, stored in the removed water storage portion 68, downward by bringing of a cock (not shown) from a closed state into an open state.

As shown in FIG. 1, the separator 46 and the protecting member 67 are positioned behind and above the front axle 25. The separator 46 and the protecting member 67 are positioned above rear end portions of the front-rear frames 27 of the front axle frame 22. The separator 46 and the protecting member 67 are positioned below the placing table 42. The separator 46 and the protecting member 67 are disposed below a rear end portion of the hood 29. To put it concretely, the separator 46 and the protecting member 67 are positioned below a rear end portion of the side cover 38. As shown in FIG. 3, the drain portion 71 of the separator 46 is positioned below the feed pump 50.

Figure 6:
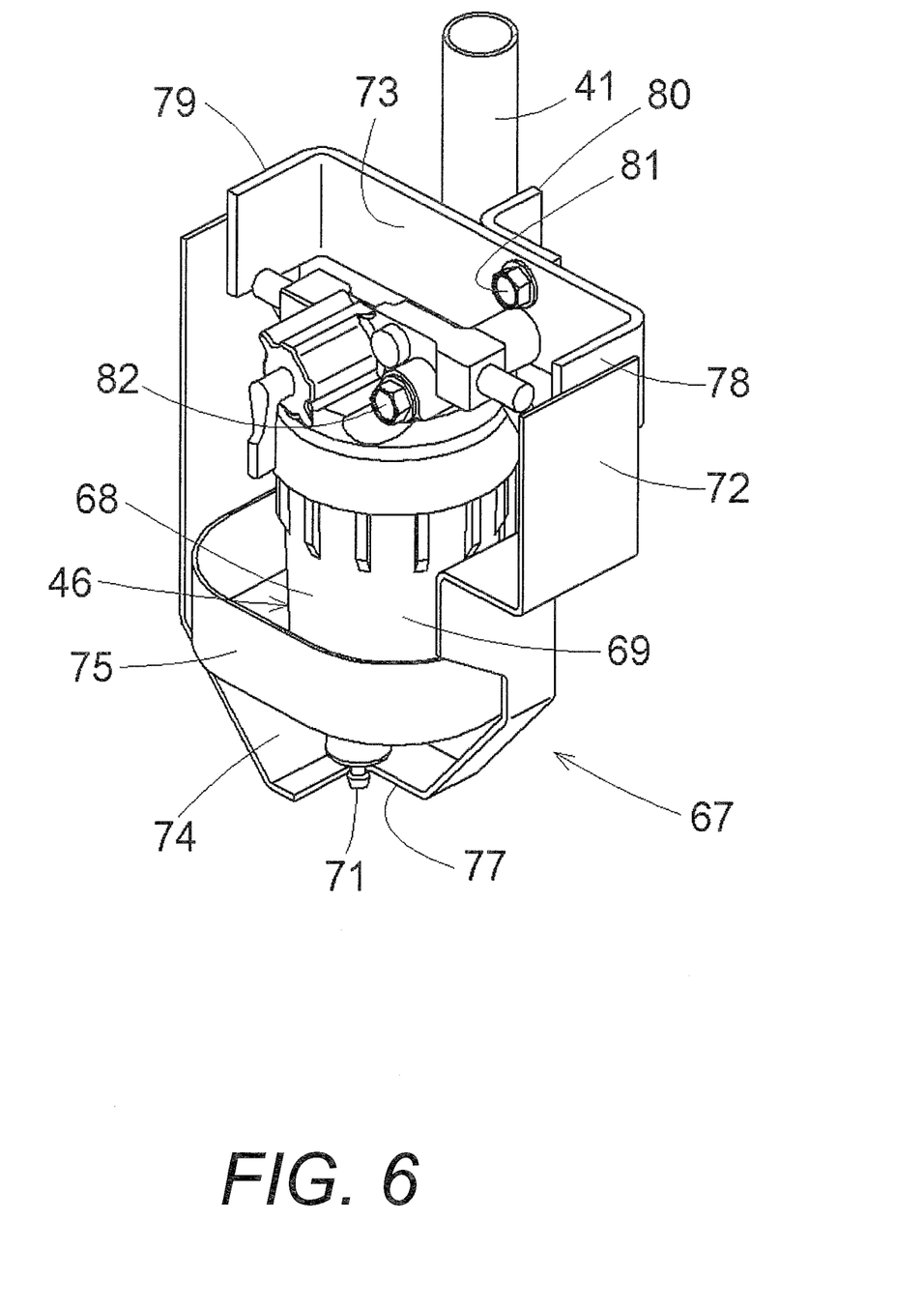
FIG. 6 is a perspective view of an area around the separator.

As shown in FIGS. 4 to 6 and the like, the protecting member 67 has a front protecting portion 72, a support portion 73, a connecting portion 74, and an outer side protecting portion 75. The front protecting portion 72 is positioned forward of the protruding portion 76 of the separator 46 protruding further sideways and outward than the side face of the hood 29 and protects a front portion of the protruding portion 76. The support portion 73 is supported by the support column portion 41. The front protecting portion 72 is supported by the support portion 73. The connecting portion 74 connects a rear portion of the support portion 73 and a lower portion of the front protecting portion 72. A drainage portion 77 for opening a space below the drain portion 71 is formed at the connecting portion 74. The drainage portion 77 is formed by cutting a part of the connecting portion 74 away. The drainage portion 77 is formed along a part of a lower face and a part of a front face of the connecting portion 74.

The front protecting portion 72 and the connecting portion 74 are formed integrally by bending a band-shaped plate body. The outer side protecting portion 75 is formed by bending a band-shaped plate body and connected by welding or the like to the lower portion of the front protecting portion 72 and a lower side of a rear portion of the connecting portion 74. The support portion 73 is formed by bending a band-shaped plate body. The support portion 73 has a front end 78 and a rear end 79 bent toward an outside of the machine body, the front end 78 is connected to the front protecting portion 72 by welding or the like, and the rear end 79 is connected to an upper end portion of the connecting portion 74 by welding or the like. In this manner, the support portion 73, the front protecting portion 72, and the connecting portion 74 integrally form a closed loop-shaped structure.

As shown in FIGS. 4, 6, and the like, the support portion 73 is fixed to an L-shaped bracket 80 fixed to the support column portion 41 by use of a first fixing member 81 formed by a bolt or the like. The separator 46 is fixed to the bracket 80 together with the support portion 73 by use of a second fixing member 82 formed by a bolt or the like. In other words, the separator 46 and the support portion 73 are fixed to the support column portion 41 by use of the same second fixing member 82 (corresponding to a "fixing member"). In other words, the separator 46 and the support portion 73 of the protecting member 67 are fastened together to the bracket 80 fixed to the support column portion 41.

As shown in FIGS. 4 to 6 and the like, the outer side protecting portion 75 is formed to cover a lower portion of an outer side portion of the light-permeable portion 69 and to open a space beside and outside an upper portion of the light-permeable portion 69. In other words, an area above the outer side protecting portion 75 is open so that the float 70 positioned inside the light-permeable portion 69 can be visually recognized sideways from outside.

Cover

As shown in FIG. 1, the hood 29 is displaced forward from a position in the prior art. In this way, the installation space for the devices positioned inside the hood 29 is broadened. In an empty clearance between a front wall portion 83 positioned at a front end portion of the cabin 17 and a rear end portion of the hood 29, an inverted-U-shaped resin cover 84 conforming to a shape of the rear end portion of the hood 29 is provided. The cover 84 covers a periphery of a portion of the fuel tank 30 positioned between the front wall portion 83 of the cabin 17 and the rear end portion of the hood 29.

Position of Battery

Figure 7:
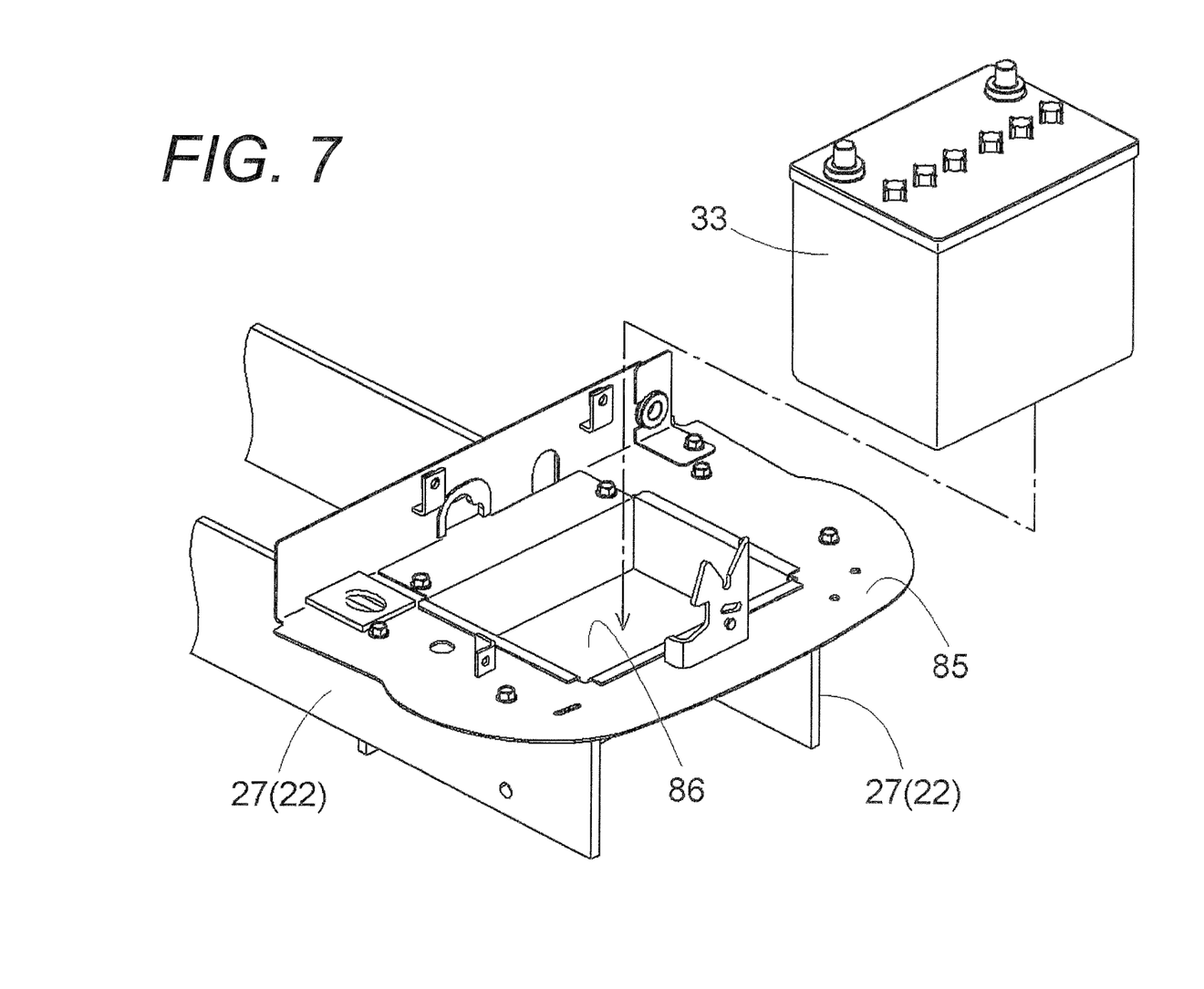
FIG. 7 is a perspective view of a layout of a battery.

As shown in FIG. 3, the battery 33 is disposed in front of the radiator 32 in the hood 29. As shown in FIGS. 3 and 7, the battery 33 is disposed as if it is dropped into a space between the left and right front-rear frames 27 of the front axle frame 22. In other words, in a side view, a lower portion of the battery 33 overlaps the front-rear frames 27 of the front axle frame 22. As shown in FIG. 7, a plate-shaped support table 85 is supported on an upper portion of the front axle frame 22. An opening is formed at a central portion of the support table 85, and a recessed installation member 86 which is formed by bending a plate member and opens on an upper side is fitted into the opening. The battery 33 is fitted into the installation member 86 and is retained in the position. In other words, because a position of the battery 33 is low, flows of wind is less likely to be obstructed by the battery 33 and the wind is smoothly supplied to the radiator 32 when headwind during traveling and wind caused by driving of the cooling fan 31 flow into the hood 29 through the front vent portion 40. In this way, it is possible to efficiently cool the radiator 32 and the like.

Other Embodiments

Other embodiments made by modifying the above-described embodiment will be shown below as examples. The following other respective embodiments are the same as the above-described embodiment in matters other than described ones. The above-described embodiment and the following respective embodiments can be suitably combined as far as a contradiction does not arise. The scope of the present invention is not limited to the above-described embodiment and the following respective embodiments of the present invention can be changed suitably without departing from the gist of the present invention.

(1) Although the separator 46 is disposed so that the part of the separator 46 protrudes further sideways and outward than the side face of the hood 29 in the example shown in the above-described embodiment, a separator 46 may be disposed so that the entire separator 46 protrudes further sideways and outward than a side face of a hood 29.

(2) Although the protecting member 67 overlaps the separator 46 in a front view in the example shown in the above-described embodiment, a protecting member 67 may not overlap a separator 46 in a front view. In this case, if a part of the protecting member 67 is positioned in front of the separator 46, the protecting member 67 can protect the separator 46 to some extent during traveling and the like.

(3) Although the front protecting portion 72 is supported on the support portion 73 in the example shown in the above-described embodiment, a front protecting portion 72 may be supported by a support column portion 41 without a support portion 73 interposed therebetween.

(4) Although the separator 46 and the support portion 73 of the protecting member 67 are fixed to the support column portion 41 by use of the same second fixing member 82 in the example shown in the above-described embodiment, a separator 46 and a support portion 73 of a protecting member 67 may be fixed to a support column portion 41 by use of different fixing members.

(5) Although the electromagnetic pump 47 is provided in the example shown in the above-described embodiment, the electromagnetic pump 47 may not be provided. In this case, fuel stored in a fuel tank 30 is sent to a separator 46, a confluence discharge portion 48, a cooling portion 49, and a filter 51 in this order by pressurization by a feed pump 50.

(6) Although the engine 20 which is the common-rail diesel engine is shown as the example in the above-described embodiment, an engine 20 may be a normal diesel engine which is not of a common rail type.

INDUSTRIAL APPLICABILITY

The embodiment of the present invention can be applied not only to the above-described tractor but also to other work vehicles such as a combine, a rice transplanter, and a mower.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle comprising:
   a front;
   a rear opposite to the front in a front-rear direction of the work vehicle;
   a lateral direction perpendicular to the front-rear direction;
   an engine;
   a hood to cover the engine;
   a fuel tank to store fuel;
   a fuel supply path via which the fuel stored in the fuel tank is to be supplied to the engine;
   a separator provided in the fuel supply path to remove water in the fuel flowing through the fuel supply path, the separator including a protruding portion protruding from the hood in the lateral direction; and
   a front protector provided at a front side of the protruding portion of the separator to protect a front portion of the protruding portion.

2. The work vehicle according to claim 1, further comprising:
   a machine body frame supporting the engine;
   a support column portion supported by the machine body frame; and
   a support portion supported by the support column portion and supporting the front protector.

3. The work vehicle according to claim 2,
   wherein the separator and the support portion are fixed to the support column portion via a fixing member.

4. The work vehicle according to claim 2, further comprising
   an upper-lower direction perpendicular to the front-rear direction and the lateral direction;
   a connecting portion connecting a rear portion of the support portion and a lower portion of the front protecting portion,
   wherein the support portion, the front protecting portion, and the connecting portion integrally form a closed loop-shaped structure.

5. The work vehicle according to claim 4,
   wherein the separator has a drain portion to discharge the water removed in the fuel downward and
   the connecting portion has a drainage portion formed by being cut off below the drain portion.

6. The work vehicle according to claim 1,
   wherein the work vehicle further comprises an upper-lower direction perpendicular to the front-rear direction and the lateral direction;
   the separator has a light-permeable portion through which light is passable, the light-permeable portion having an inner side portion and the outer side portion with respect to a center of the light-permeable portion in the lateral direction, the outer side portion being farther from the hood than the inner side portion in the lateral direction and
   the work vehicle further includes an outer side protecting portion to cover a lower portion of the outer side portion of the light-permeable portion and to uncover an upper portion of the light-permeable portion.

7. The work vehicle according to any one of claim 1,
   wherein the separator is disposed below a rear end of the hood.

8. The work vehicle according to any one of claim 1, further comprising
   a placing table on which an oil tank to store the fuel to be supplied to the fuel tank is placeable, the separator being positioned below the placing table.

* * * * *